United States Patent [19]
Hobson

[11] Patent Number: 5,809,555
[45] Date of Patent: Sep. 15, 1998

[54] METHOD OF DETERMINING SIZES OF 1:1 AND 2:1 MEMORY INTERLEAVING IN A COMPUTER SYSTEM, CONFIGURING TO THE MAXIMUM SIZE, AND INFORMING THE USER IF MEMORY IS INCORRECTLY INSTALLED

[75] Inventor: Louis B. Hobson, Tomball, Tex.

[73] Assignee: Compaq Computer Corporation, Houston, Tex.

[21] Appl. No.: 573,231

[22] Filed: Dec. 15, 1995

[51] Int. Cl.⁶ .................................................. G06F 12/00
[52] U.S. Cl. ........................... 711/172; 711/157; 711/5; 364/DIG. 1
[58] Field of Search .............................. 395/497.03, 484, 395/402, 442; 365/230.04

[56] References Cited

U.S. PATENT DOCUMENTS

| | | | |
|---|---|---|---|
| 3,796,996 | 3/1974 | Wriey et al. | 395/484 |
| 4,760,522 | 7/1988 | Weatherford et al. | 395/497.03 |
| 4,908,789 | 3/1990 | Blokkum et al. | 395/497.03 |
| 4,951,248 | 8/1990 | Lynch | 395/402 |
| 5,027,313 | 6/1991 | Colley | 395/497.03 |
| 5,119,486 | 6/1992 | Albonesi | 395/497.03 |
| 5,341,486 | 8/1994 | Castle | 395/405 |
| 5,440,713 | 8/1995 | Lin et al. | 395/485 |

OTHER PUBLICATIONS intel® Pentium® Pro Processor BIOS Writer's Guide, Version 2.0, pp. iii and 2–8, Jan. 1996.

*Primary Examiner*—Tod R. Swann
*Assistant Examiner*—David Langjahr
*Attorney, Agent, or Firm*—Pravel, Hewitt, Kimball & Krieger

[57] ABSTRACT

A method for configuring memory in a computer system. The method calls for determining the maximum configurable size of installed memory modules for each of a plurality of interleave options. The computer system is configured to utilize the largest of the maximum configurable sizes of interleave options. The maximum configurable sizes of interleave options are further compared to determine if the memory modules are installed in a manner providing the largest amount of configurable memory. If not, an error message is sent to the user.

21 Claims, 15 Drawing Sheets

METHOD OF DETERMINING SIZES OF 1:1 AND 2:1 MEMORY INTERLEAVING IN A COMPUTER SYSTEM, CONFIGURING TO THE MAXIMUM SIZE, AND INFORMING THE USER IF MEMORY IS INCORRECTLY INSTALLED

FIELD OF THE INVENTION

The invention relates to personal computers, and more particularly to a method for configuring system memory to the larger of 1:1 or 2:1 interleaving and informing the user if memory is installed in a less than optimal manner.

BACKGROUND OF THE INVENTION

The microprocessors used in modern computer systems (PCs) are being produced with ever-increasing clock speeds. Affordable fast memory chips, however, have not kept pace. Many techniques have been developed over the years to compensate for the differences in speed between microprocessors and the random access memory (RAM) used for system memory. These techniques include memory caching, wait states, page-mode chips, and interleaved access. All allow for the use of slower memory chips than would be suggested by direct comparison to the clock period of the microprocessor.

Interleaved memory access is most common in systems running with a system clock speed greater than 20 MHz, and can almost double the effective speed of RAM chips. The concept is relatively simple. RAM in any PC is organized into banks, with each bank holding as many bits per location as the number of data wires in the memory bus. For a system based on the 386DX or 486 processors from Intel Corporation, the bank width is usually 32 bits. For a Pentium-based system, the bank width is usually 64 bits, while a Pentium Pro-based system has a bank width of 64 or 128 bits.

Two-way (2:1) interleaved memory access refers to the practice of arranging memory chips such that all the even addresses are in one bank (or group of banks) of memory and all of the odd addresses are in another. The PC must therefore have an even number of banks of RAM in order to use interleaved memory access. Memory addresses can then be alternated between the even bank(s) and the odd bank(s), such that memory accessed in order of location in memory address space will be accessed alternately from an even bank and from an odd bank.

The total amount of RAM needed to allow for interleaved memory access is a function of the processor data bus width and the size of chips, single in-line memory modules (SIMMs), or double in-line memory modules (DIMMs) that are used. As an example, consider a 486 based computer system with 32 bit-wide memory accesses. A bank of memory contains 36 bit-wide chips (with one parity bit per byte); or four byte-wide SIMMs, two 18-bit wide SIMMs, one 36-bit wide SIMM, etc. If 1-megabit chips or 1 Megabyte (MByte) SIMMs are used, the amount of memory required to use interleaved accessing without losing any memory is a multiple of 8 MBytes.

The performance of modern computer operating systems can be loosely correlated to the amount of configured system memory. Increasing memory generally increases performance. Mismatches in the sizes of memory modules may result in the loss of some memory in a system configured for 2:1 interleaving. As a result, configuring a system for faster interleaved memory access may not yield optimal performance if the total amount of available memory is thereby decreased. The benefits of any increase in available memory usually outweigh the slower access times for non-interleaved (1:1) access.

Other problems can result in memory being configured less than optimally. For example, lack of proper grounding when installing memory modules can result in electro-static discharge damage to portions of the integrated circuitry. Memory module pins that don't connect properly to memory sockets may also cause loss of available memory.

Additionally, when memory is configured sub-optimally, the user is not getting the best use of the parts which have been purchased. In other words, the user has wasted money and clearly this is undesirable.

SUMMARY OF THE INVENTION

The present invention relates to a new and improved method for configuring memory in a computer system to allow optimal use of memory where the memory can be interleaved or non-interleaved. The preferred embodiment first determines the configurable size of installed RAM using 2:1 interleaving and two options of 1:1 interleaving. For each interleave option, memory controller configuration registers corresponding to the amount of memory in each row of memory are assigned initial test values. Test patterns are then written to each row to determine if RAM has been installed in that row. If RAM is present, the row is sized by writing and reading additional test patterns in an iterative process beginning with the initial row size limits stored in the memory controller. If no memory aliasing occurs during an initial pass, the row size value for the row in question is doubled and the process is repeated until an alias occurs. The row size value is then halved and saved. Once all rows have been sized in this manner, revised row size values are written to the appropriate registers in the memory controller. The row size values for each row are then totalled to produce a top of memory count reflecting the total configurable memory.

After the memory counts for all interleave options have been determined, the memory counts are tested to verify that memory is present. If no memory is found, an error message is sent and the CPU is halted until reset. The memory counts are then compared to ascertain if memory modules have been installed in an optimal manner. If 1:1 interleave options do not return an equal memory count, or the total of the 1:1 memory counts does not equal the memory count for 2:1 interleaving, an error flag is set and the user is subsequently informed of the installation error.

The memory counts are also examined to determine if the memory configuration registers of the memory controller contain the values for the largest configurable amount of RAM. If not, the sizing routine mentioned above is repeated for the interleave option that returns the largest memory count. In this manner, the computer system is configured to utilize the maximum possible amount of installed memory.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
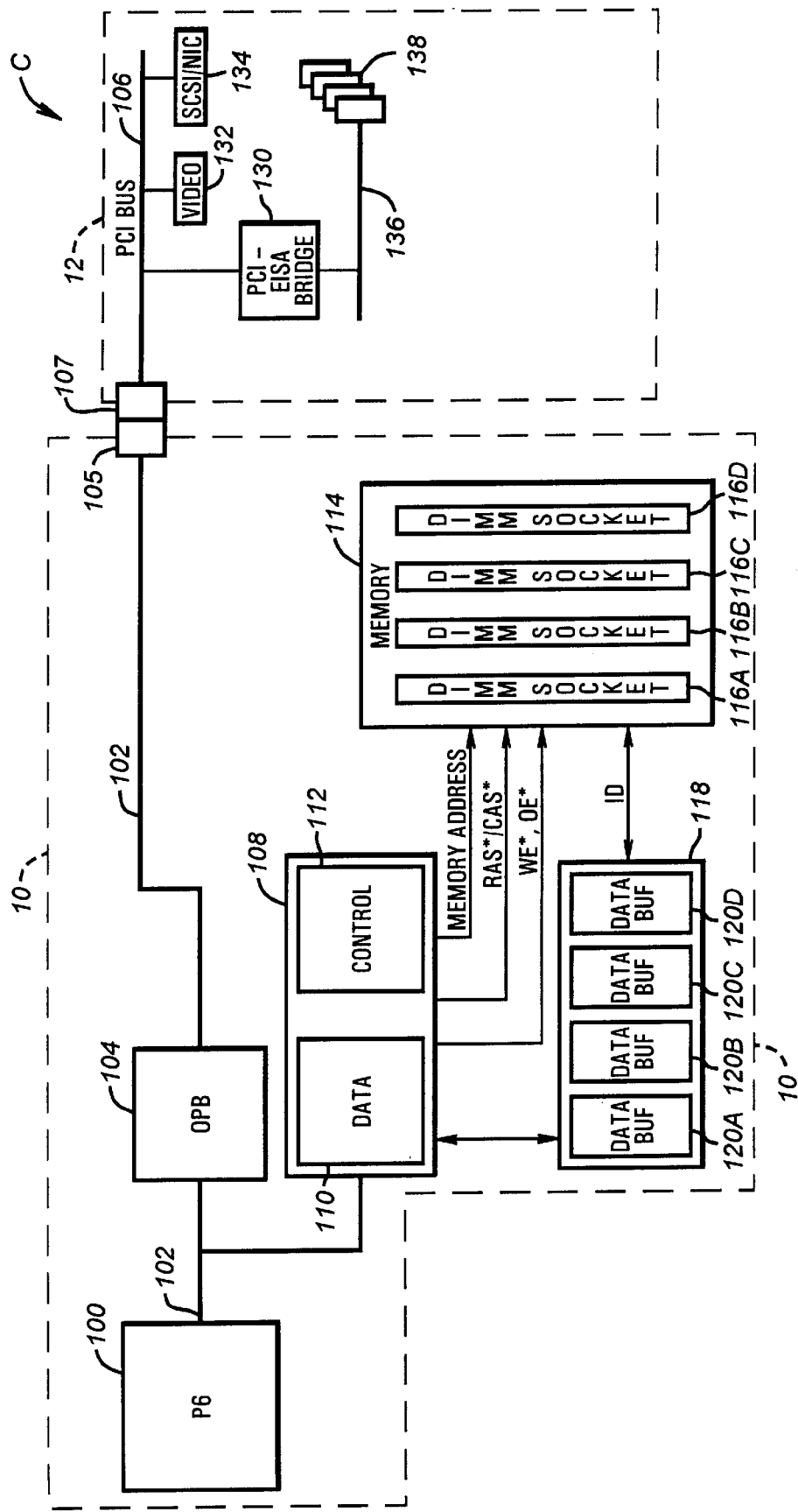
FIG. 1 is an exemplary computer system incorporating four DIMM sockets whose contents are configured according to the present invention.

Proceeding now to FIG. 1, a block diagram of a CPU board 10 for connection to a system board 12 in a computer system C is shown. The CPU board 10 includes a Pentium Pro or P6 processor 100 which is connected to a processor bus 102. The processor bus 102 includes data, address, and control portions. The processor bus 102 is connected to a processor-PCI bridge 104, which performs the necessary interface functions between the processor bus 102 and a PCI bus 106 located on a system board 12. The processor-PCI bridge 104 is connected to the PCI bus 106 through connectors 105 and 107.

The system board 12 includes the PCI bus 106 and an ISA or EISA expansion bus 136, as well as a PCI-EISA or PCI-EISA bridge 130 to control cycles between the PCI bus 106 and EISA or ISA bus 136. Components connected to the PCI bus 106 include a video controller 132 and a SCSI/network interface card 134. The expansion bus 136 includes expansion slots 138 for receiving I/O expansion boards.

On the CPU board 10, the processor bus 102 is further connected to a memory controller 108, which includes a data portion 110 and a control portion 112. The control portion 112 provides the necessary control signals to main memory 114, which is preferably implemented with dynamic random access memories (DRAMs). The various control signals provided by the control portion 112 to the memory 114 include the memory address, the RAS* and CAS* row and column address strobe signals, the write enable signal WE*, and the output enable signal OE*. In the present description, signal names followed by the character "*" indicate that the signals are active low.

In the preferred embodiment, the main memory 114 has a storage capacity of 512 MBytes and is configurable up to a maximum of 2 Gigabytes. The main memory 114 receives memory boards via four DIMM or double in-line memory module sockets 116A–D. Configuration of the DIMM modules placed in these sockets 116A–D is accomplished according to the present invention.

The memory data bus ID, which is 72 bits wide, is connected between the main memory 114 and read and write ahead buffer logic 118. The read and write ahead buffer logic 118 includes four data buffer portions 120A–D, which correspond to DIMM sockets 116A–D, respectively. The read and write ahead data buffer logic 118 is connected to the data portion 110 of the memory controller 108. The data portion 110 provides the necessary control signals to the read and write ahead buffer logic 118 and acts as a data buffer between the processor 100 and the data buffers 120A–D.

Figure 2:
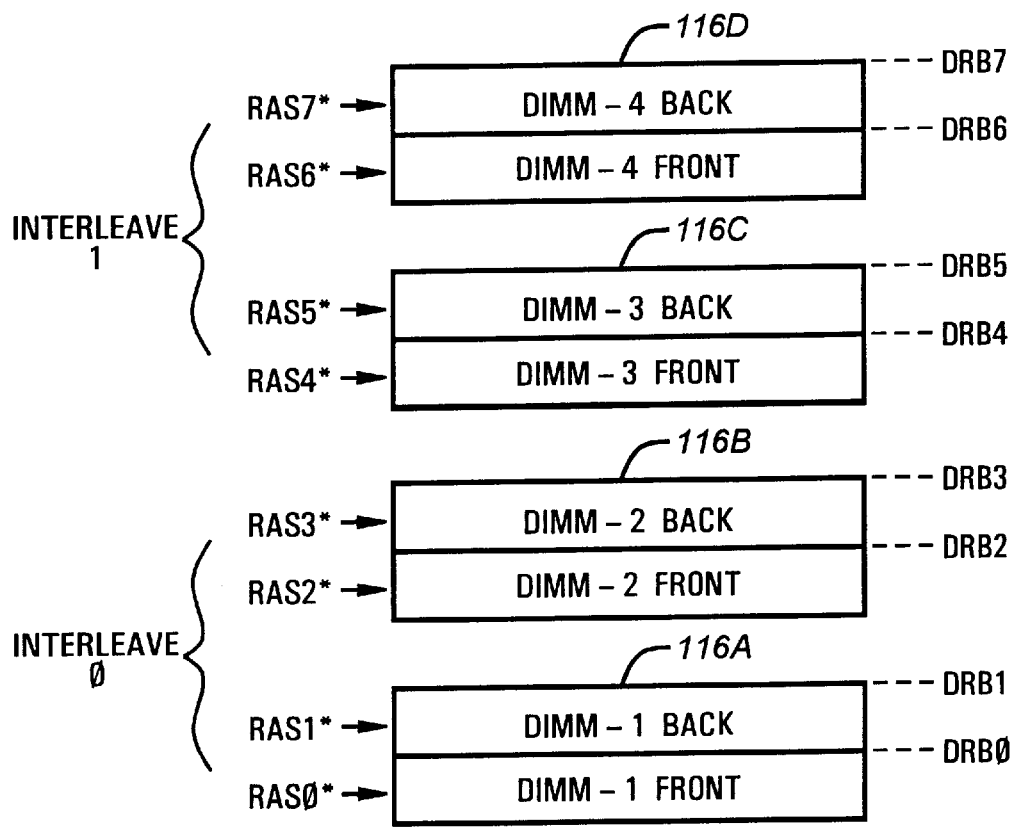
FIG. 2 is block diagram illustrating configuration details of the DIMM sockets in the representative computer system of FIG. 1.

Referring now to FIG. 2, a block diagram illustrating the relationship between the DIMM sockets 116A–D of a representative computer system and the row boundary registers DRB0–DRB3 is shown. Also shown are the row address strobe signals RAS0*–RAS3*. Operation of these signals is well-known to those skilled in the art.

The DIMM sockets 116A–D can be populated with either single-sided or double-sided DIMM modules. If single-sided DIMMs are used, only RAS0* and RAS1* signals are used. If the sockets are filled with double-sided DIMMs, all four RAS* signals are used. Each RAS* signal is intended to decode a 64-bit wide bank of memory.

The row boundary registers DRB0–DRB7 define upper and lower addresses for each of the eight rows of memory. Contents of the row boundary registers can be represented as follows:

DRB0=Total amount of memory in row 0 (in MBytes)

DRB1=Total amount of memory in row 0+row 1

DRB2=Total amount of memory in row 0+row 1+row 2

DRB3=Total amount of memory in row 0+row 1+row 2+row 3

DRB4=Total amount of memory in row 0+row 1+row 2+row 3+row 4

DRB5=Total amount of memory in row 0+row 1+row 2+row 3+row 4+row 5

DRB6=Total amount of memory in row 0+row 1+row 2+row 3+row 4+row 5+row 6

DRB7=Total amount of memory in row 0+row 1+row 2+row 3+row 4+row 5+row 6+row 7

The values contained in these registers represent the upper address limits of the eight rows. In the preferred embodiment, register values represent 4 MByte increments. If DRB0 is programmed to 02h, therefore, bank 0 would go from 00000000h to 007FFFFFh, or from 0 to 8 MBytes. The amount of memory in a given row is determined by subtracting the value in the previous row register from the value in its row register (for example, the amount of memory in row 2=DRB2–DRB1). Empty rows are programmed to the same value as the previous row. The registers DRB4 to DRB7 are not utilized in the preferred embodiment, but would be needed with the addition of another memory board.

Since each row can be programmed to an arbitrary number of MBytes, the size of the bank as programmed in the row boundary register may be smaller than the actual number of MBytes contained in the bank. This can be useful if part of a bank of memory is bad and needs to be mapped out. For instance, if an 8 MByte bank has a bad memory cell in the sixth MByte, then the bank size can be programmed to 5 MBytes. The remaining two good MBytes are lost.

As depicted in FIG. 2, interleave 0 includes DIMM sockets 116A and 116B, while interleave 1 encompasses DIMM sockets 116C and 116D. This categorization assumes that single-sided DIMMs are used. In the event that double-sided DIMMs occupy the sockets, interleave 0 includes the front and back rows of sockets 116A and 116B while interleave 1 includes the front and back rows of socket 116C and 116D.

A BlastRAM routine 400 (FIGS. 4A–4D) of the present invention tests the sockets using different interleave options and configures the memory controller 108 such that the largest configurable amount of RAM is utilized. 1:1 interleaving will be chosen if more configurable memory is thereby available—even if the result is a narrower data bus (64 bit v. 128 bit). If the memory controller 108 has been configured for 2:1 interleaving, RAM must be added two DIMMs at a time. If a single DIMM is added, it will be lost unless its addition causes 1:1 interleaving to return the largest configurable memory count.

Representative memory configuration according to the present invention is illustrated by the following examples in which all DIMMs are single-sided:

| SOCKET 116A | SOCKET 116B | SOCKET 116C | SOCKET 116D | |
|---|---|---|---|---|
| 8 | 8 | 8 | — | (MBytes) |

RESULT: sockets 116C lost; system configured for 16 MBytes of 2:1 interleave memory using socket 116A and 116B; error sent because all of configured memnory cannot be addressed.

| | | | | |
|---|---|---|---|---|
| 8 | 8 | 32 | — | (MBytes) |

RESULT: socket 116B lost; system configured for 1:1 interleaving, with 40 MBytes of memory provided by interleave 0 sockets 116A and 116C; error sent.

| | | | | |
|---|---|---|---|---|
| 32 | 8 | 8 | 64 | (MBytes) |

RESULT: sockets 116A and 116C lost; system configured for 1:1 interleaving, with 72 MBytes of memory provided by interleave 1 sockets 116B and 116D; error sent.

| | | | | |
|---|---|---|---|---|
| 128 | — | 128 | — | (MBytes) |

RESULT: system confogured for 1:1 interleaving; 256 MBytes of memory available; no error sent because all configured memory can be addressed.

It is contemplated that the present invention could be used to configure memory having forms other than DIMM modules and interleaves other than 1:1 or 2:1, such as 4:1.

Figure 3A:
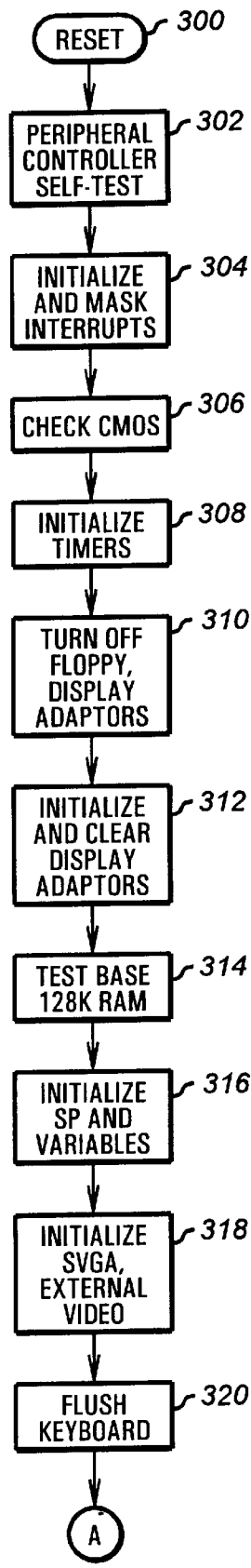
FIGS. 3A, 3B, and 3C are flowchart sequences of the power-on self-test sequence of a computer system incorporating the method of the present invention.
Figure 3B:
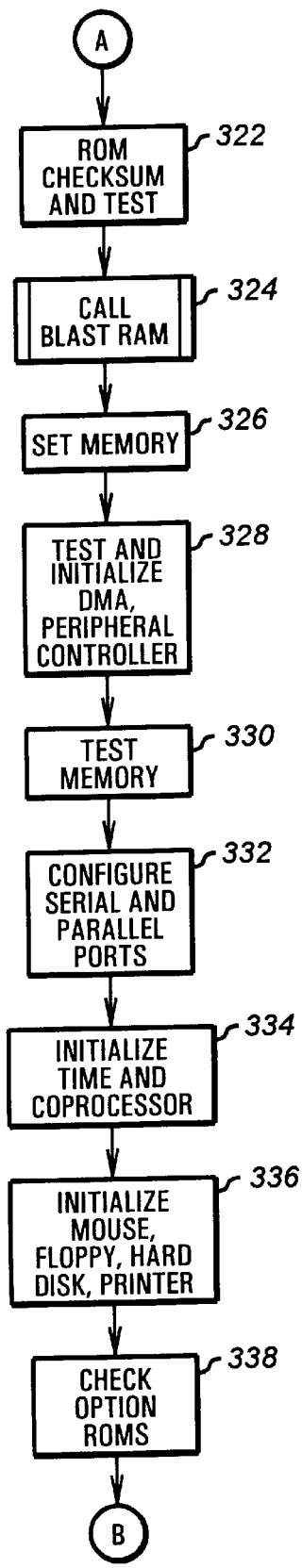
Figure 3C:
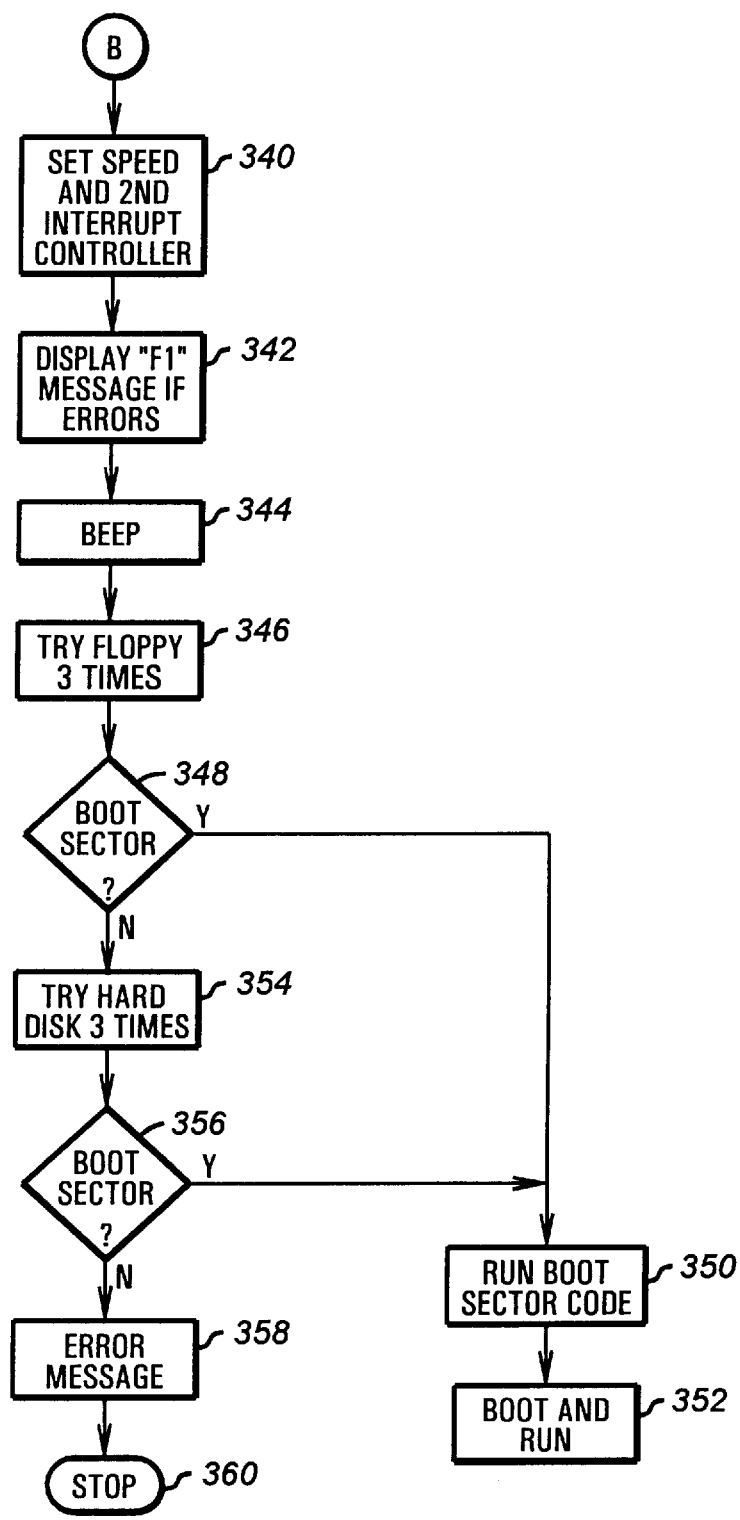

FIGS. 3A, 3B, and 3C show a flowchart sequence for an exemplary Power On Self Test (POST) routine according to the present invention. Many of the components referred to are not illustrated in FIG. 1 for sake of clarity. Turning first to FIG. 3A, the reset sequence 300 is initiated when the computer system C is turned on. Control then proceeds to step 302 for commencement of the self-testing of a keyboard interface or peripheral controller such as the 8042 from Intel. Control proceeds to step 304 where various initialization and masking of interrupts occurs.

Control next proceeds to step 306 where the complimentary metal-oxide-semiconductor (CMOS) memory is checked. Control proceeds to step 308 where the timers contained in computer system C are initialized. Control proceeds to step 310 where the floppy drive unit and display adapters are turned off.

Control then proceeds to step 312 where the display adapters are initialized and cleared. Control proceeds to step 324 where the software routine BlastRAM 400 is called. The BlastRAM routine 400 (described more fully in conjunction with FIGS. 4A–D) examines the installed RAM using 1:1 and 2:1 memory interleaving and configures the memory controller 108 to use the option providing the maximum memory.

Control passes to step 314 where the first 128 KBytes of RAM are tested. Operation proceeds to step 316 where the stack pointer and necessary other variables are initialized. Control proceeds to step 318 where the video graphics adapter or external video card is initialized. Control next proceeds to step 320 where any characters received from the keyboard of the computer are flushed. Control then proceeds to step 322 (FIG. 3B) where a read only memory (ROM) checksum test is performed to determine the integrity of the ROM.

Control next proceeds to step 326 where the various partitions of the memory, such as base, extended or expanded, as familiar to those in the personal computer industry, are set. Control proceeds to step 328 where the direct memory access controller is tested and initialized. Also in step 328, the peripheral controller is tested.

Control then proceeds to step 330, where the memory that has been set is now tested. Control passes to step 332 where any serial and parallel ports present in the computer system C are configured. Operation proceeds to step 334 where the time of day is initialized from values contained in the CMOS memory/real time clock unit and any numerical processor that is present is initialized. Control then proceeds to step 336, where any mouse or auxiliary device, the floppy drive, the hard disk unit and the printer port are initialized. Control proceeds to step 338 where the presence and accuracy of any option ROMs located in the system are determined.

Control proceeds to step 340 (FIG. 3C) where a second additional interrupt controller is initialized. Control then passes to step 342 where an error message indicating entry of the F1 key is displayed if any errors have occurred in the various tests that have previously been performed. After the F1 key is depressed, if necessary, control proceeds to step 344 where a beep is issued by the computer to indicate to the user that the POST sequence is completing.

Control next proceeds to step 346 where three attempts are made to read the boot sector on the floppy disk drive. If in step 348 it is determined that a boot sector has not been obtained, control proceeds to step 354 and three tries are made to read a boot sector from the hard disk. If a boot sector is obtained in either of steps 348 or 354, control proceeds to step 350 where the computer executes the boot sector code. Control proceeds to step 352 where the computer proceeds to boot and begins its normal operations.

If a boot sector was not obtained in step 356, control proceeds to step 358 where an error message is provided indicating that a boot sector could not be obtained and control proceeds to step 360 where the computer essentially stops.

FIGS. 4A, 4B, 4C and 4D are flowchart sequences of the BlastRAM routine 400 run during the POST routine of FIGS. 3A–3C. As mentioned, the BlastRAM routine 400 determines the optimal configuration for any RAM that has been installed in the system.

First, all memory holes are cleared in step 402. Control then passes to step 404, where any level 1 and level 2 caches are disabled. Control proceeds to step 406 where devices attached to the PCI bus 106, such as a video controller 132, are disabled. Control proceeds to step 408 to determine if the system is being reset via a warm boot or a hard boot. If a warm boot is not detected, control proceeds to step 410 and the memory controller 108, the processor-PCI bridge 104, and the read and write ahead buffer logic 118 are initialized. In the case of a warm boot, step 410 is bypassed and control proceeds to step 412, where the system is sent into protected mode. Control then proceeds to step 414 where the memory controller 108 is configured for 1:1 interleaving with interleave 0 active.

In step 416, a subroutine FeelMemory 500 of FIGS. 5A–5D is called. Using 1:1 interleaving with interleave 0 active, FeelMemory 500 determines the maximum configurable size of RAM installed in the DIMM sockets 116A and 116B and stores the resulting value in the EDX register. When control returns to step 418, the memory value contained in EDX is copied to the EBP register.

Control then proceeds to step 420 where the memory controller 108 is configured for 1:1 interleaving, with interleave 1 active. Control proceeds to step 422 where the subroutine FeelMemory 500 of FIGS. 5A–5D is called again. FeelMemory 500 determines the maximum configurable size of RAM installed in the DIMM sockets 116C and 116D and stores the value in the EDX register. In step 424, the memory count returned for 1:1 interleaving with interleave 1 active is copied to the EDI register.

The memory controller 108 is next configured for 2:1 interleaving in step 426. Control proceeds to step 428 where the subroutine FeelMemory 500 is called yet again. The memory count returned by the FeelMemory subroutine 500 is stored in the low word of the ECX register in step 430.

Control proceeds to step 432 and the memory counts contained in the EBP, EDI, and ECX registers are logically "OR"'ed together. Control next proceeds to step 434 where a determination is made if memory is present within the system based on whether the zero flag was set by the operation of step 432. If the zero flag was set in step 432 (i.e., no memory is present in the system), control proceeds to step 436 and an error message is displayed to the user before the CPU is halted in step 438.

Figure 4A:
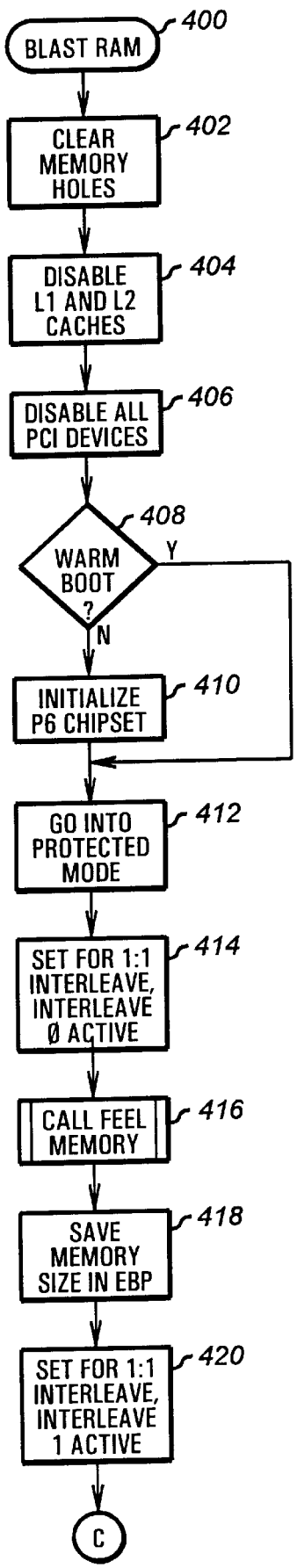
FIGS. 4A, 4B, 4C, 4D, 5A, 5B, 5C, 5D, 6 and 7 are flowchart diagrams illustrating a memory configuration routine according to the present invention.
Figure 4B:
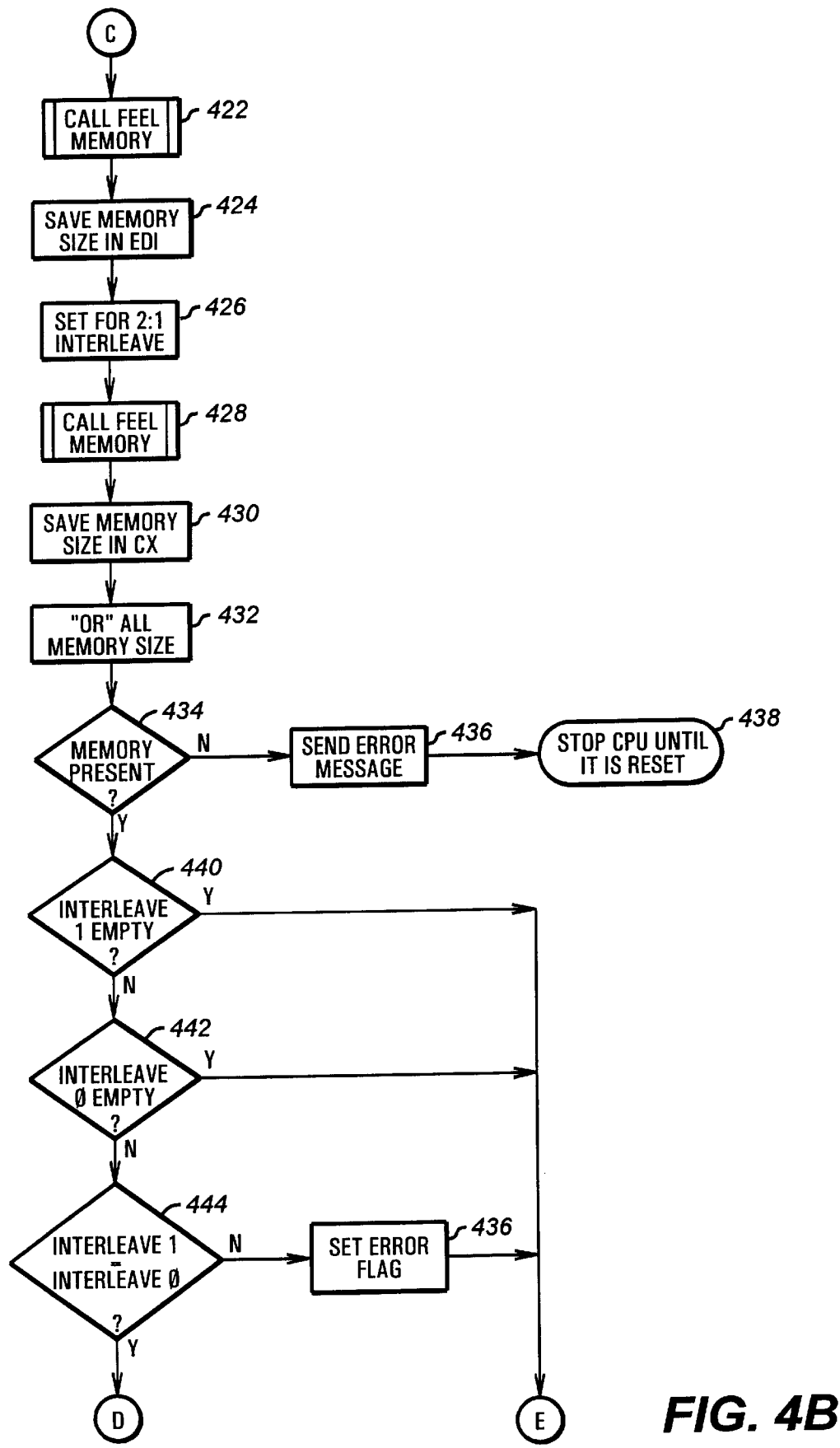
Figure 4C:
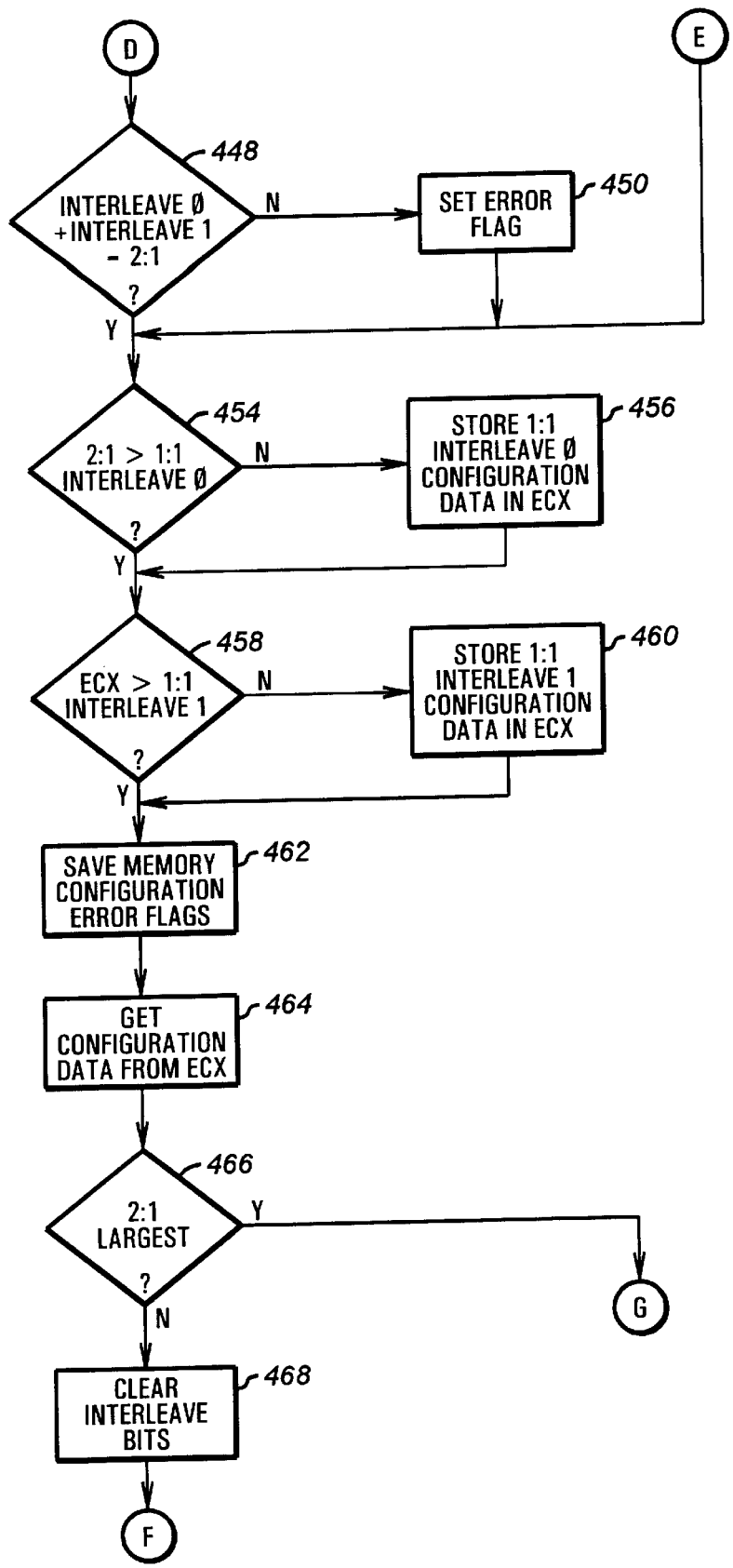
Figure 4D:
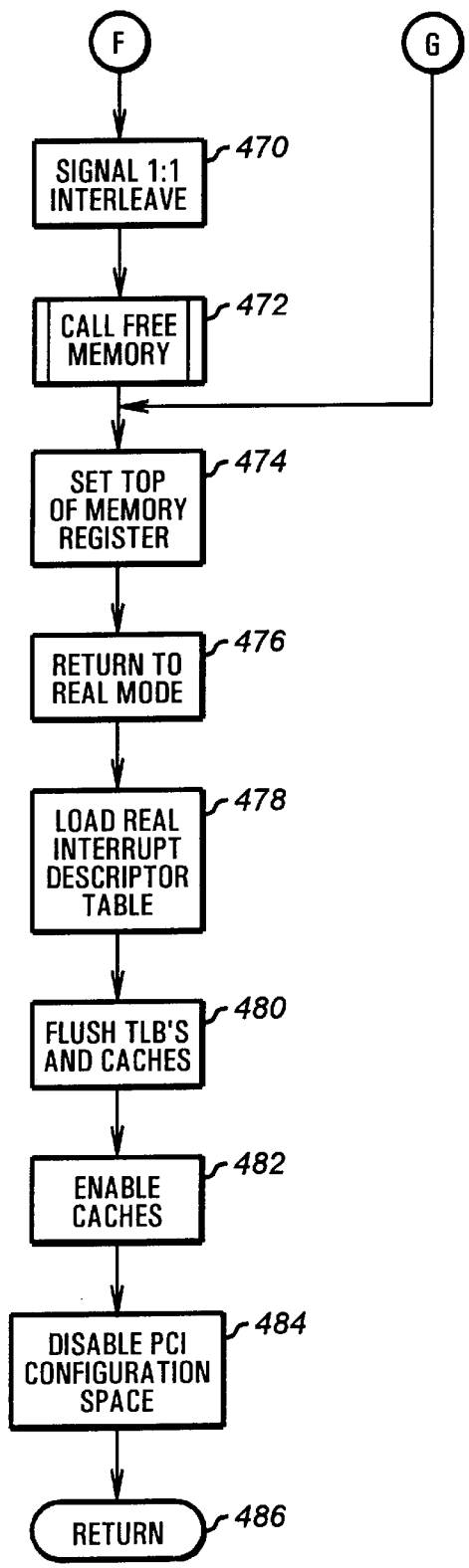
Figure 5A:
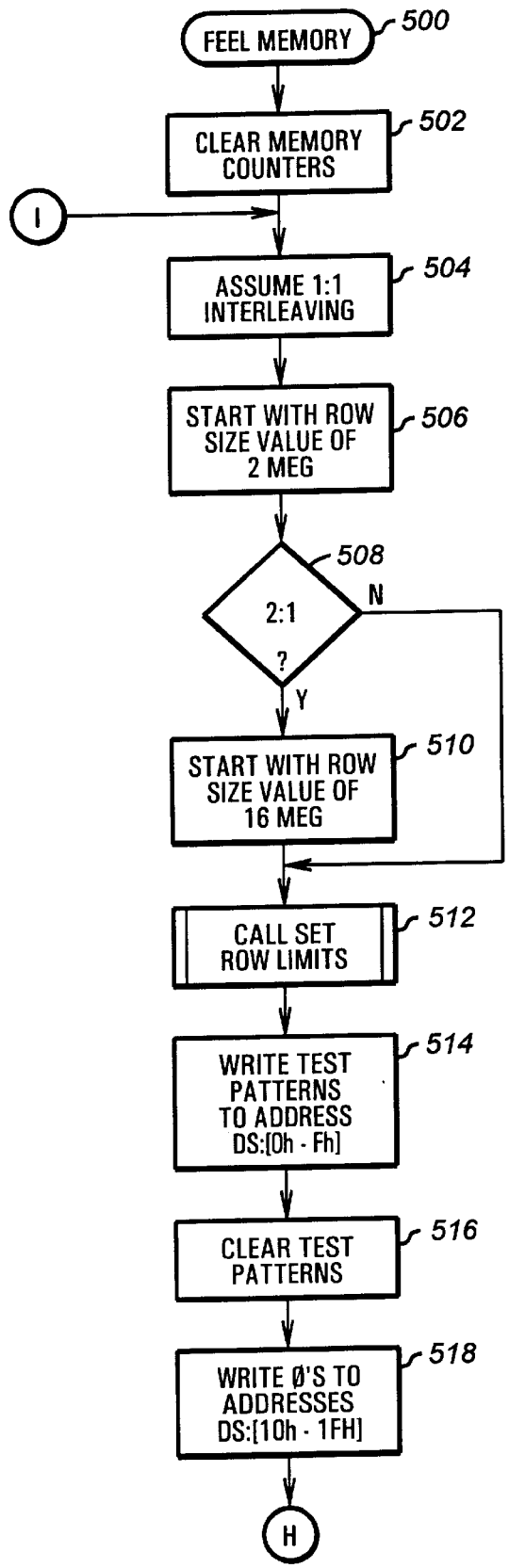
Figure 5B:
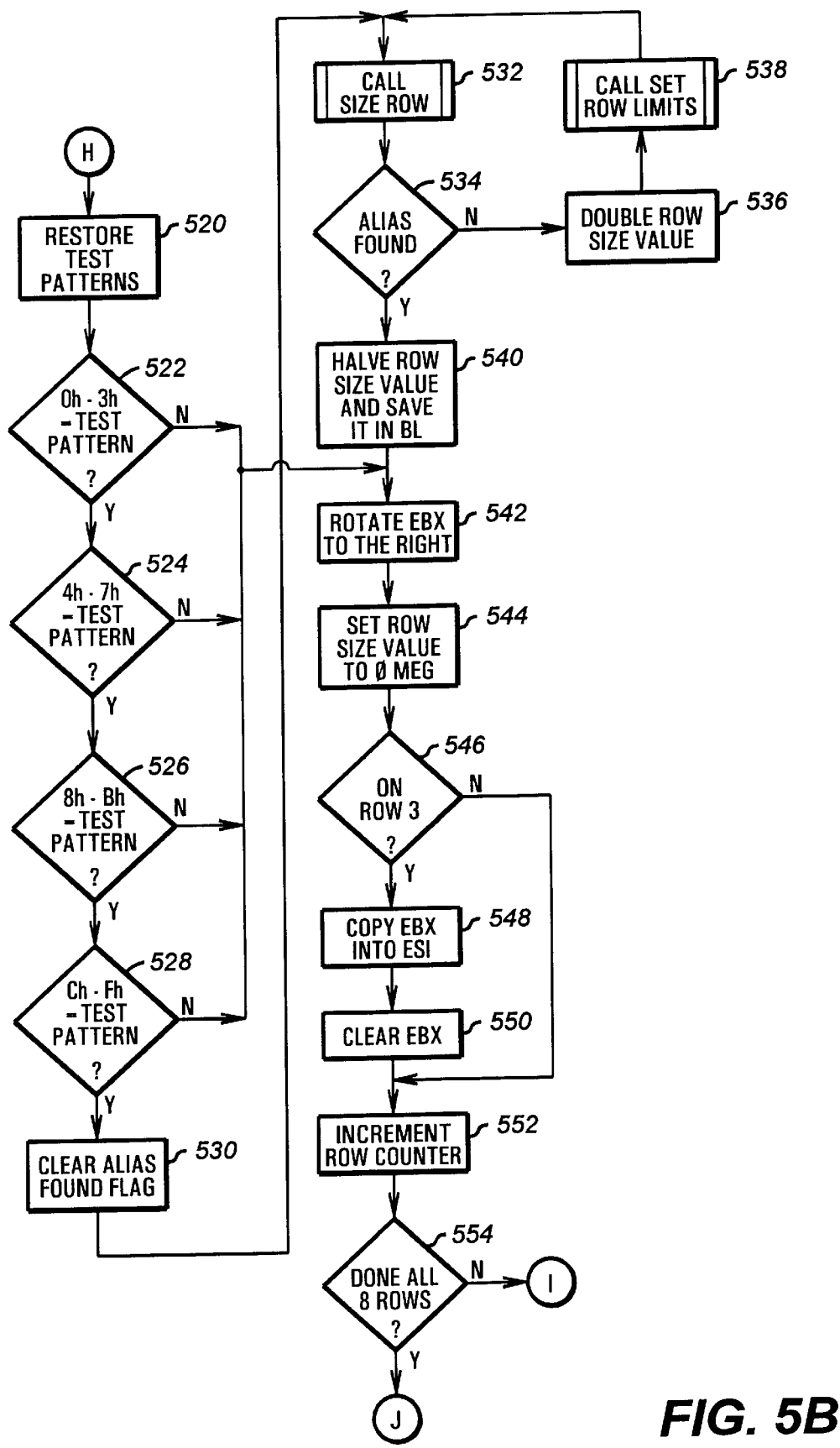
Figure 5C:
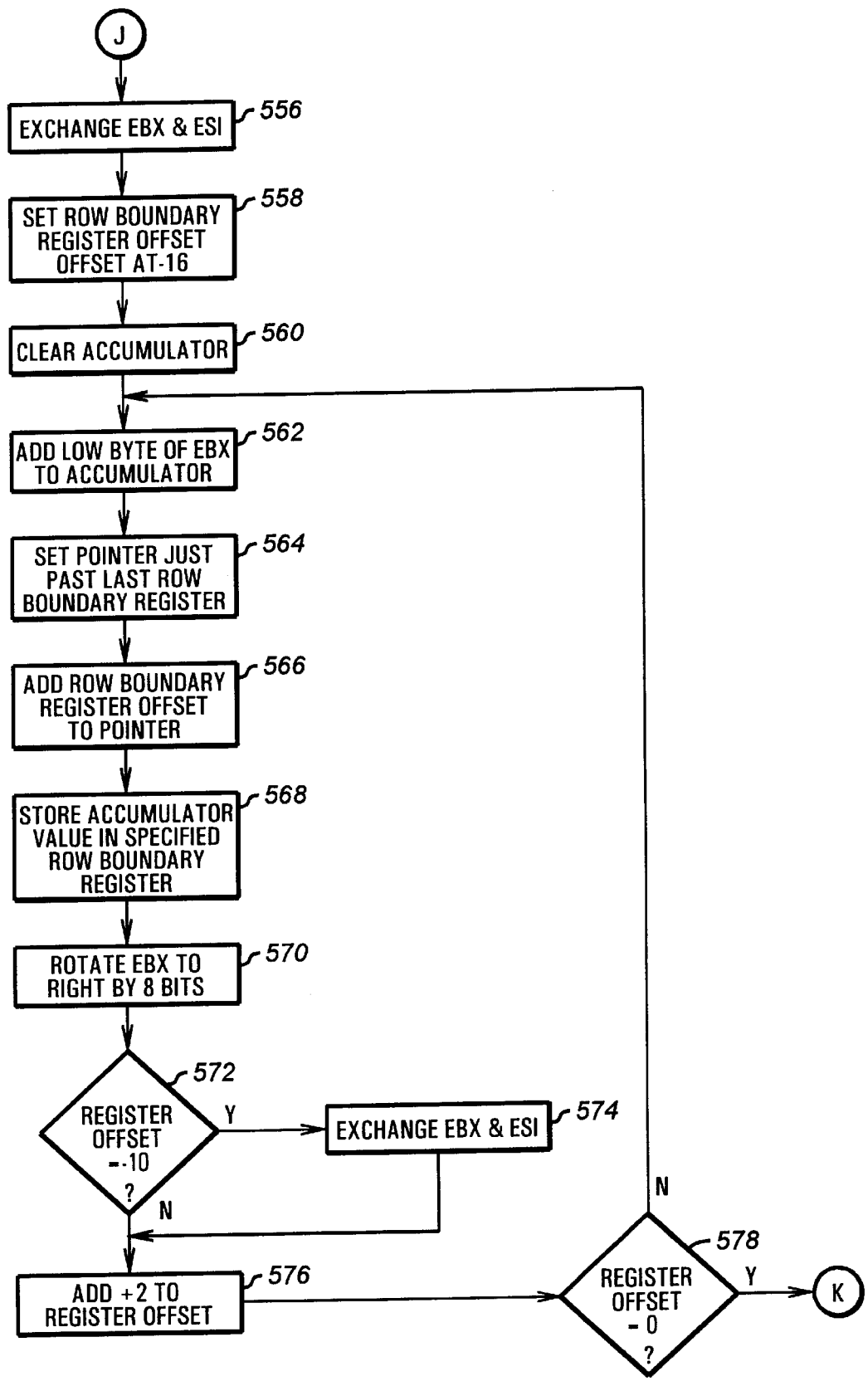
Figure 5D:
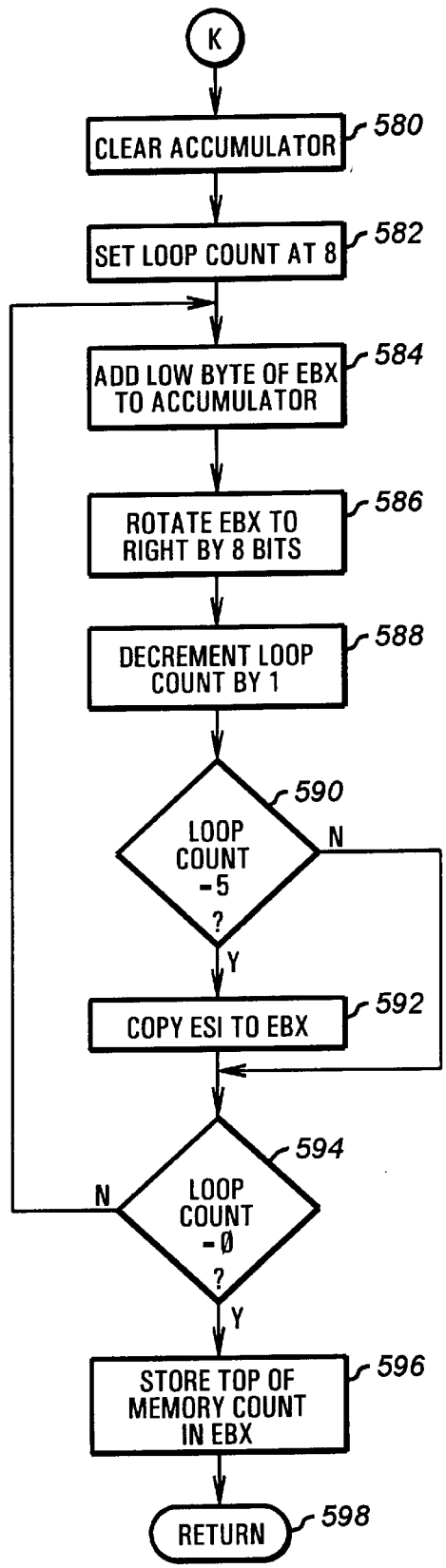

If memory is detected in step 434, control proceeds to step 440. Steps 440–450 set an error flag if the DIMMs have not been installed in such a way as to provide the largest amount of configurable memory. In step 440, the register containing the memory count for interleave 1 is tested for a positive value. If this register is empty, control proceeds to step 442 where the register corresponding to 1:1 interleave 0 is tested. If it is determined that either 1:1 interleave 0 or 1 is empty, no error flags need to be set and control proceeds to step 454 (FIG. 4C).

If the registers tested in steps 440 and 442 both show a positive memory count, control proceeds to step 444 where the memory counts for 1:1 interleave 1 and 1:1 interleave 0 are compared. If they are equal, control proceeds to step 448 to determine if the memory counts for 1:1 interleave 0 plus 1:1 interleave 1 equal the memory count for 2:1 interleaving. If they are equal, control proceeds to step 454. In the event that the memory counts for interleave 0 and interleave 1 are not equal, an error flag is set in step 446 before control proceeds to step 454. Likewise, if interleave 0 plus interleave 1 do not equal the memory count for 2:1 interleaving an error flag is set in step 450 before control proceeds to step 454. As mentioned, these error flags indicate that the memory modules have not been installed in an optimal manner.

Determination of the memory interleaving configuration that provides the computer system C with the largest amount of memory commences at step 454. In this step, the memory count for 2:1 interleaving is compared with the memory count for 1:1 interleave 0. If the memory count for 1:1 interleave 0 is larger, its value is stored in register ECX in step 456. Otherwise, this step is bypassed and control proceeds directly to step 458 where the value contained in the ECX register is compared with the memory count for 1:1 interleave 1. Should the latter be larger, control proceeds to step 460 and the value for 1:1 interleave 1 is moved into register ECX. In either case, control next proceeds to step 462 where memory configuration error flags are saved.

Because the memory controller 108 was configured for 2:1 interleaving in step 426, reconfiguration is necessary if either 1:1 interleave 0 or 1:1 interleave 1 returned a larger memory count. Thus, control proceeds to step 464 where the configuration data from ECX is retrieved for comparison to that 2:1 interleaving. Control then passes to step 466 to determine if 2:1 interleaving provides the largest memory count (i.e. the value in ECX is equal to the memory count for 2:1 interleaving). If not, control proceeds to step 468 and the interleave configuration bits are cleared in the memory controller 108. Control then proceeds to step 470 where 1:1 interleaving is signaled.

The subroutine FeelMemory 500 is next called in step 472 in order to restore the configuration registers to the interleave option providing the most memory. Control then proceeds to step 474 which is also were control would proceed if the memory count for 2:1 interleaving was determined to be the largest in step 466 (configuration registers are already set for 2:1 interleaving at this point). In step 474 a top of memory register in the processor-PCI bridge 104 is set. In the preferred embodiment, the top of memory boundary ranges up to 512 MBytes, in 2 MByte increments. This register is typically set to the top of main memory and corresponds to the largest configurable value of installed RAM.

Control next proceeds to step 476 where the operating mode is returned to the real mode from the protected mode. Control proceeds to step 478 and the real interrupt descriptor table is loaded. Control then proceeds to step 480 where the translation lookaside buffers (TLB's) and caches are flushed. The caches are then enabled in step 482, and the PCI configuration space is disabled in step 484. Control then proceeds to step 486 where a return is made to the main POST routine 300.

Referring now to FIGS. 5A through 5D, the FeelMemory subroutine 500 called by the BlastRAM 400 routine is illustrated in detail. As mentioned above, FeelMemory returns the maximum amount of configurable RAM for the type of interleaving that has been set. The sequence begins with step 502 where all memory counters are cleared. Control then passes to step 504 and the subroutine assumes 1:1 interleaving. Next, in step 506 a temporary row size value of 2 MBytes is set. Control proceeds to step 508 to determine if the memory controller 108 is configured for 2:1 interleaving. If it is, a temporary row size value of 16 MBytes is set in step 510. Control then proceeds to step 512 which is also where control would proceed if a determination is made in step 508 that 2:1 interleaving is not set.

Figure 6:
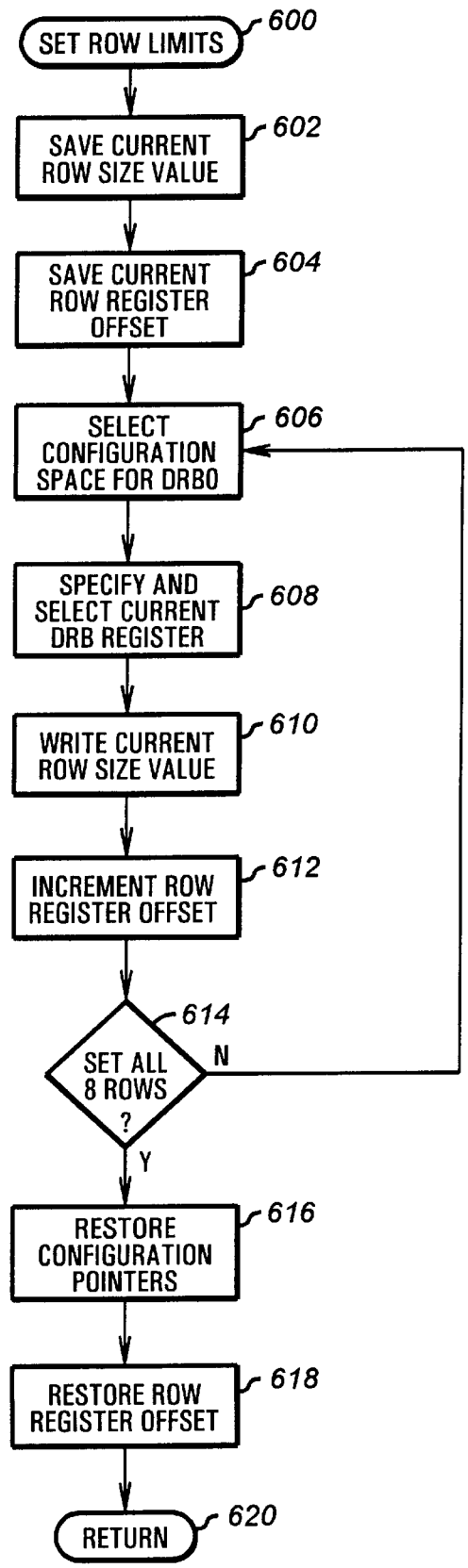

Step 512 calls the subroutine SetRowLimits 600. This subroutine, illustrated in FIG. 6, serves to set the eight row boundary registers DRB0–DRB7 of the memory controller 108 in accordance with the row size values of steps 506 or 510. The contents of registers DRB0–DRB7 are discussed in detail in conjunction with FIG. 2.

Before writing to the row registers, the subroutine SetRowLimits 600 saves the current row size value in step 602. Control then proceeds to step 604 where the current row register offset is saved. Control next proceeds to step 606 where the configuration space for the row registers DRB0–DRB7 memory controller 108 is selected. The current row register is specified and selected in step 608, and the current row size value is written in the ensuing step 610. Control then proceeds to step 612 where the row register offset is incremented.

Step 612 is followed by step 614 which determines whether all eight row registers have been set. If not, control returns to step 606. If all eight rows have been set, control proceeds to step 616 where the configuration pointers are restored. Control then passes to step 618 where the row register offset is restored. The SetRowLimits subroutine 600 ends in the next step 620 and control reverts back to the FeelMemory subroutine 500.

Upon return to the FeelMemory subroutine 500 of FIGS. 5A–5D, control passes to step 514 and test patterns are written to the bytes of addresses 0h-Fh (128 bits). Control proceeds to step 516 where the register containing the test patterns is cleared. Control then proceeds to step 518 where "0's" are written to the bytes of addresses 10h-1Fh to determine if the addresses are aliased, as that would have the zero values overwrite the test pattern.

Control next passes to step 520 (FIG. 5B) where the test patterns are restored. Addresses 0h-3h are compared with the appropriate test pattern in step 522. If memory is present and the pattern matches, control proceeds to step 524 where the data in addresses 4h-7h are compared with the appropriate test pattern. If this data matches, control next proceeds to step 526 where the data contained in addresses 8h-Bh is compared with the appropriate test pattern. If this data matches, control proceeds to step 528 and the data in addresses Ch-Fh is compared with the appropriate test pattern. If the data in all memory locations is found to match the test patterns, control proceeds to step 530 where the alias found flag is cleared.

Figure 7:
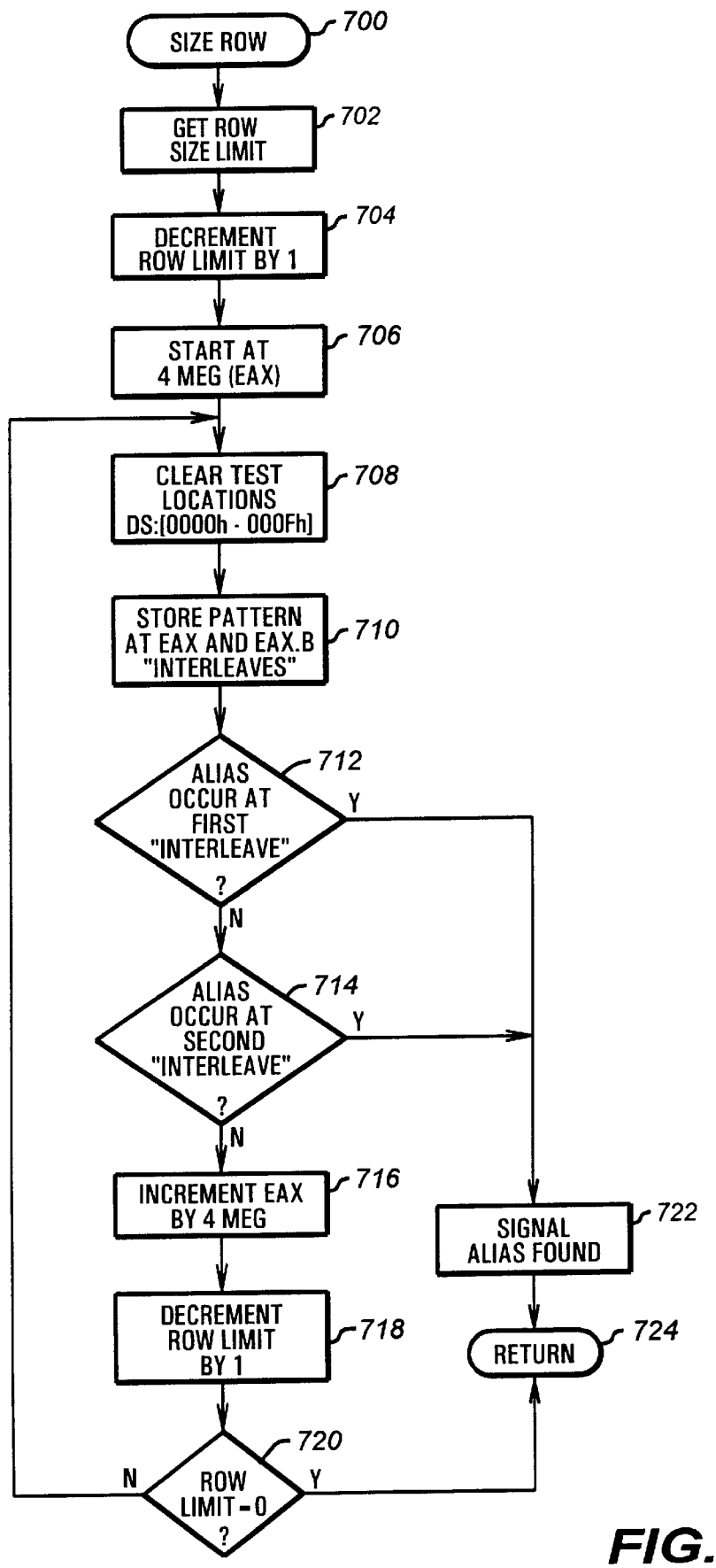

Control next proceeds to step 532 and the subroutine SizeRow 700 of FIG. 7 is called. SizeRow 700 functions to size the memory in the current row and begins with step 702 in which the row size limit, as set by SetRowLimits 600, is retrieved. Control proceeds to step 704 where the row size limit is decremented by 1, thus establishing a loop counter. Control next proceeds to step 706 in which a beginning memory value of 4 MBytes is loaded into register EAX. Control proceeds to step 708 and test locations 0000h-000Fh are cleared. In step 710, test patterns are stored in two locations, the first of which has an effective address beginning with the values stored in the EAX register, and the second of which has an effective address beginning with the values stored in the EAX register offset by 8 bytes. These two addresses are used to test for a first possible interleave and a second possible interleave.

Control then passes to step 712 where a determination is made whether an alias occurred at a first possible interleave. An alias occurs when a DRAM row boundary register has been programmed for a value larger than the actual DRAM bank. For example, if an 8 MByte bank has been programmed as a 10 MByte bank, the first and second MBytes would alias with the ninth and tenth MBytes.

If no alias is detected in step 712 control passes to step 714 where a second possible interleave is tested for an alias. If an alias occurs in either of steps 712 or 714, control passes to step 722 where an alias found signal is set. Control then passes from step 722 to step 724 where a return is made to the FeelMemory subroutine 500.

If an alias is not found in step 714, control passes to step 716 and the EAX register is incremented by 4 MBytes. Control then passes to step 718 where the row size limit is decremented by 1. Control proceeds to step 720 where the row limit compared with "0". In the event that the row size limit has been decremented to "0", control proceeds to step 724 and a return to the FeelMemory subroutine 500 is made. If the row size limit equals a positive number, control is returned to step 708, and the remaining rows are sized.

Returning now to FIG. 5B, control proceeds from the SizeRow subroutine 700 to step 534 to determine if an alias has occurred. If no alias occurred during the execution of SizeRow 700, the temporary row size value is doubled in step 536. Control then proceeds to step 538 where a return is made to the SetRowLimits subroutine 600 of FIG. 6 and the row registers are updated with the doubled row size value. Control then returns to step 532 and the SizeRow subroutine 700 is repeated.

If an alias is found in step 534, control proceeds to step 540 where the current row size value is halved and saved in the low byte of register EBX. This byte now contains a value representing the amount of configurable RAM in the current row. Control then proceeds to step 542 which is also where control would proceed if the test pattern comparisons of any of steps 522, 524, 526 or 528 showed a mismatch. As mentioned above, a mismatch with a test pattern indicates the absence of functional RAM. In step 542, the EBX register—which contains the memory values for rows 0–3— is rotated 1 byte to the right in order to put the next row size in the low byte of the register.

Control next passes to step 544 and the register containing the temporary row size value is cleared. Control proceeds to step 546 where the row loop counter is tested to determine if rows 0–3 have been sized. If they have, the memory values for rows 0–3 are copied from the EBX register to the ESI register and the EBX register is then cleared in step 550. Control proceeds to step 552, which is also where control would proceed if a determination is made in step 546 that row 3 has not been reached. In step 552, the row loop counter is incremented.

Control next proceeds to step 554 and the row counter is tested to determine if all eight rows have been sized. If not, control is transferred back to step 504 and the next row is sized. If all eight rows have been sized, control proceeds to step 556 (FIG. 5C) where the values contained in the EBX and ESI registers are exchanged. The EBX register now contains memory values for row 0–3 while the ESI register contains memory values for rows 4–7. The row sizes are next stored in the row boundary registers DRB0–DRB7 of the memory controller 108.

Control proceeds to step 560 where an accumulator register is cleared. Control is then transferred to step 562 where the low byte of the EBX register is added to the accumulator. Control next proceeds to step 564 where a pointer is set just past the last row boundary register. Control proceeds to step 566 where the row boundary register offset of step 558 is added to the pointer of step 564. Control then proceeds to step 568 where the value stored in the accumulator register is copied into the row boundary register presently specified by the pointer. Next, the EBX register is rotated to the right by 8 bits in step 570. The low byte of EBX now contains the next memory value to be added to the accumulator.

Control proceeds to step 572 where the row boundary register offset is compared to "–10". If the offset equals "–10", meaning that four row boundary registers have been written, control proceeds to step 574 where the EBX and ESI register values are exchanged. Following this exchange, or if the row boundary register offset does not equal "–10" as determined by step 572, control proceeds to step 576 and the row boundary register offset is incremented by "+2". Control then proceeds to step 578 to determine if all row boundary registers have been written by comparing the row boundary register offset value to "0". If all registers have not been written, control is returned to step 562 and the processed is repeated.

If the row boundary register offset has reached "0", control proceeds to step 580 (FIG. 5D) and the accumulator is cleared. In preparation for returning a total memory count for use by the main routine BlastRAM 400, control proceeds to step 582 where a loop counter is established with a value of 8. Control then proceeds to step 584 where the low byte of the EBX register is added to the accumulator. Control proceeds to step 586 where the EBX register is rotated to the right by 8 bits, thus placing the memory count for the next row into the low byte of this register. Next, the loop count is decremented by 1 in step 588. Control then proceeds to step 590 to determine if memory count values for four banks have been added to the accumulator. This function is accomplished by comparing a loop counter to the value "5".

If the loop counter has a value of "5" in step 590, control proceeds to step 592. In step 592, the memory values for rows 4–7 are copied from the ESI register to the EBX register. If the loop counter does not equal "5", step 592 is bypassed and control proceeds directly to step 594 to determine if the memory counts for all 8 banks have been added to the accumulator. If the loop count value has not been decremented to "0", control is returned to step 584 and the memory count for the next bank is added to the accumulator. If the loop count equals "0", control proceeds from step 594 to step 596 and the accumulator value is stored in the register EDX. Control then proceeds to step 598 and a return is made to the main BlastRAM routine 400.

Thus, it can be seen that the present invention provides an efficient method for configuring system memory to the larger of 1:1 or 2:1 interleaving. In addition, the user is informed if memory modules have not been installed in a manner providing the largest possible amount of configurable memory.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the scope and spirit of the invention.

What is claimed is:

1. A method for configuring memory in a computer system, said method comprising the steps of:

determining a maximum configurable size of installed memory modules for each of a plurality of interleave options;

comparing the maximum configuration sizes to determine the largest;

configuring the computer system to utilize the largest of the maximum configuration sizes;

comparing the maximum configuration sizes to determine if the memory modules are installed in a manner providing the largest amount of configurable memory; and providing an error message if the memory modules are not installed to provide the largest amount of configurable memory.

2. The method of claim 1, wherein the plurality of interleave options includes two-way (2:1) interleaving and two options of one-way (1:1 ) interleaving.

3. The method of claim 1, wherein each installed memory module is organized into a plurality of rows, each of the rows having a corresponding row size value, and said step of configuring the computer system to utilize the largest of the maximum configuration sizes includes the steps of:

totalling the row size values for each of the interleave options;

verifying that a memory controller within the computer system has been configured to utilize the maximum configuration size; and, if not, configuring the memory controller in accordance with the maximum configuration size.

4. The method of claim 1 wherein said step of comparing the maximum configuration sizes to determine if the memory modules are installed in a manner providing the largest configurable amount of memory includes either of the steps of:

comparing the maximum configuration sizes of 1:1 interleave options and setting an error flag if the 1:1 interleave options are not equal; or comparing the maximum configuration size for 2:1 interleave option to the cumulative total of the maximum configuration sizes for 1:1 interleave options and setting an error flag if the maximum configuration size of the 2:1 interleave option does not equal the cumulative total.

5. The method of claim 1 further including the steps of:

testing the maximum configuration sizes to determine if any configurable memory is present; and halting operation of the computer system if no configurable memory is found.

6. A computer memory containing a program which directs a computer system to:

determine a maximum configurable size of installed memory modules for each of a plurality of interleave options;

compare the maximum configuration sizes to determine the largest;

configure a computer system to utilize the largest of the maximum configuration sizes;

compare the maximum configuration sizes to determine if the memory modules are installed in a manner providing the largest amount of configurable memory; and provide an error message if the memory modules are not installed to provide the largest amount of configurable memory.

7. The computer memory of claim 6, wherein the plurality of interleave options includes two-way (2:1) interleaving and two options of one-way (1:1) interleaving.

8. The computer memory of claim 6 wherein each installed memory module is organized into a plurality of rows, each of the rows having a corresponding row size value, and said direction to configure the computer system to utilize the largest of the maximum configuration sizes includes directions to:

total the row size values for each of the interleave options;

verify that a memory controller within the computer system has been configured to utilize the maximum configuration size; and, if not, configure the memory controller in accordance with the maximum configuration size.

9. The computer memory of claim 6 wherein said direction to compare the maximum configuration sizes to determine if the memory modules are installed in a manner providing the largest configurable amount of memory includes either of the directions to:

compare the maximum configuration sizes of 1:1 interleave options and set an error flag if the 1:1 interleave options are not equal; or compare the maximum configuration size for a 2:1 interleave option to the cumulative total of the maximum configuration sizes for 1:1 interleave options and set an error flag if the maximum configuration size of the 2:1 interleave options does not equal the cumulative total.

10. The computer memory of claim 6 wherein said program further directs the computer system to:

test the maximum configuration sizes to determine if any configurable memory is present; and halt operation of the computer system if no configurable memory is found.

11. A computer system, comprising:

a plurality of sockets for receiving memory modules;

a memory controller connected to said plurality of sockets, wherein said memory controller can access said plurality of sockets in a plurality of interleave options;

means for determining a maximum configurable size of installed memory modules for each of the plurality of interleave options;

means for comparing the maximum configuration sizes to determine the largest;

means for configuring the computer system to utilize the largest of the maximum configuration sizes;

means for comparing the maximum configuration sizes to determine if said memory modules are installed in a manner providing the largest amount of configurable memory; and means for providing an error message if said memory modules are not installed to provide the largest amount of configurable memory.

12. The computer system of claim 11, wherein the plurality of interleave options includes two-way (2:1) interleaving and two options of one-way (1:1) interleaving.

13. The computer system of claim 11 wherein said means for configuring the computer system to utilize the largest of the maximum configuration sizes includes:

means for totalling the row size values for each of the interleave options;

means for verifying that a memory controller within said computer system has been configured to utilize the maximum configuration size; and, if not, means for configuring said memory controller in accordance with the maximum configuration size.

14. The computer system of claim 11 wherein said means for comparing the maximum configuration sizes to determine if said memory modules are installed in a manner providing the largest configurable amount of memory includes either of:

means for comparing the maximum configuration sizes of 1:1 interleave options and setting an error flag if the 1:1 interleave options are not equal; or means for comparing the maximum configuration size for a 2:1 interleave option to the cumulative total of the maximum configuration sizes for 1:1 interleave options and setting an error flag if the maximum configuration size of the 2:1 interleave option does not equal the cumulative total.

15. The computer system of claim 11 further including:

means for testing the maximum configuration sizes to determine if any configurable memory is present; and means for halting operation of said computer system if no configurable memory is found.

16. A computer system, comprising:

a processor;

a plurality of sockets for receiving memory modules;

a memory controller coupled to said plurality of sockets and said processor, wherein said memory controller is capable of accessing said plurality of sockets in a plurality of interleave options;

system memory coupled to said processor, said system memory containing a power-on program which directs said processor to:

determine, for each of a plurality of interleave options, a maximum configurable size of any memory modules installed in said plurality of sockets;

compare the maximum configuration sizes to determine the largest;

configure said memory controller to utilize the largest of the maximum configuration sizes;

compare the maximum configuration sizes to determine if the memory modules are installed in a manner providing the largest amount of configurable memory; and provide an error message if the memory modules are not installed to provide the largest amount of configurable memory.

17. The computer system of claim 16, wherein each installed memory module is organized into a plurality of rows, each of the rows having a corresponding row size value, and said direction to configure said memory controller to utilize the largest of the maximum configuration sizes includes directions to:

total the row size values for each of the interleave options;

verify that said memory controller has been configured to utilize the maximum configuration size; and, if not, configure the memory controller in accordance with the maximum configuration size.

18. The computer system of claim 16 wherein said direction to compare the maximum configuration sizes to determine if the memory modules are installed in a manner providing the largest amount of configurable memory includes either of the directions to:

compare the maximum configuration sizes of 1:1 interleave options and set an error flag if the 1:1 interleave options are not equal; or compare the maximum configuration size for a 2:1 interleave option to the cumulative total of the maximum configuration sizes for 1:1 interleave options and set an error flag if the maximum configuration size of the 2:1 interleave option does not equal the cumulative total.

19. The computer system of claim 16 wherein the power-on program further directs said processor to:

examine the maximum configuration sizes to determine if any configurable memory is present; and halt operation of the computer system if no configurable memory is present.

20. A computer system, comprising:

a processor;

a plurality of sockets for receiving memory modules;

a memory controller coupled to said plurality of sockets and said processor, wherein said memory controller is capable of accessing said plurality of sockets in a plurality of interleave options; and system memory coupled to said processor, said system memory containing a power-on program which includes a blast ram routine that determines optimal random access memory interleave configuration.

21. The computer system of claim 20, wherein said blast ram routine includes code that when executed directs said processor to:

determine, for each of a plurality of interleave options, a maximum configurable size of any memory modules installed in said plurality of sockets;

compare the maximum configuration sizes to determine the largest;

configure said memory controller to utilize the largest of the maximum configuration sizes;

compare the maximum configuration sizes to determine if the memory modules are installed in a manner providing the largest amount of configurable memory; and provide an error message if the memory modules are not installed to provide the largest amount of configurable memory.

* * * * *